(12) United States Patent
Xue et al.

(10) Patent No.: US 7,120,157 B2
(45) Date of Patent: *Oct. 10, 2006

(54) EDGE ROUTER FOR OPTICAL LABEL SWITCHED NETWORK

(75) Inventors: Fei Xue, Davis, CA (US); Julie Taylor, Davis, CA (US); Sung-Joo Ben Yoo, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/218,816

(22) Filed: Sep. 2, 2005

(65) Prior Publication Data

US 2006/0008273 A1    Jan. 12, 2006

Related U.S. Application Data

(63) Continuation of application No. 10/341,237, filed on Jan. 13, 2003, now Pat. No. 6,940,863.

(51) Int. Cl.
*H04L 12/28* (2006.01)

(52) U.S. Cl. ...................... 370/401; 370/412; 370/392; 398/49

(58) Field of Classification Search ...................... None
See application file for complete search history.

(56) References Cited

U.S. PATENT DOCUMENTS

| 6,111,673 | A | 8/2000 | Chang et al. | 359/123 |
|---|---|---|---|---|
| 6,493,768 | B1 | 12/2002 | Boutcher | 709/330 |
| 6,525,850 | B1 | 2/2003 | Chang et al. | 359/124 |
| 6,665,495 | B1 * | 12/2003 | Miles et al. | 398/54 |
| 6,721,315 | B1 | 4/2004 | Xiong et al. | 370/389 |
| 6,891,793 | B1 * | 5/2005 | Suzuki et al. | 370/217 |
| 6,943,925 | B1 * | 9/2005 | Islam | 359/108 |
| 2002/0186453 | A1 | 12/2002 | Yoo | 359/326 |
| 2003/0067653 | A1 * | 4/2003 | Aicklen et al. | 359/139 |
| 2004/0120261 | A1 | 6/2004 | Ovadia et al. | 370/252 |

OTHER PUBLICATIONS

Fei Xue et al., "The performance improvements in optical packet-switched networks by traffic shaping of self-similar traffic", *Optical Fiber Communication Conference and Exhibit 2002*, OFC 2002, Wednesday Morning, Anaheim, CA Mar. 17-22, 2002, paper WG4, pp. 218-219.

(Continued)

*Primary Examiner*—Duc Ho
(74) *Attorney, Agent, or Firm*—Park, Vaughan & Fleming, LLP

(57) ABSTRACT

An edge router for interfacing an optical label switched core IP network with client networks, which may be electronically switched and operate with different protocol. The core network has a limited number of ports, each with an edge router, which receives packets from one or more associated client networks and queues them according to egress port on the core network and optionally additionally according to attribute of service. When a queue has exceed a maximum packet length or a timeout limit assigned to the queue, the packets including their headers are assembled into a super packet for transmission across the core network in optical form, preferably using optical routers incorporating wavelength conversion of payloads and switching according to an attached label. The edge router at the egress port disassembles the super packet into constituent packets for respective destinations on the client network.

19 Claims, 11 Drawing Sheets

OTHER PUBLICATIONS

Fei Xue et al., "Self-similar traffic shaping at the edge router in optical packet-switched networks", *IEEE International Conference on Communications*, 2002, pp. 2449-2453.

Hyuek Jae Lee et al., "A simple all-optical label detection and swapping technique incorporating a fiber bragg grating filter", *IEEE Photonics Technology Letter*, vol. 13, No. 6, Jun. 2001, pp. 635-638.

H.J. Lee et al. "Simple, polarisation-independent, and dispersion-insensitive SCM signal extraction technique for optical switching systems application", *Electronics Letters*, vol. 37, No. 20, Sep. 27, 2001, pp. 1240-1241.

* cited by examiner

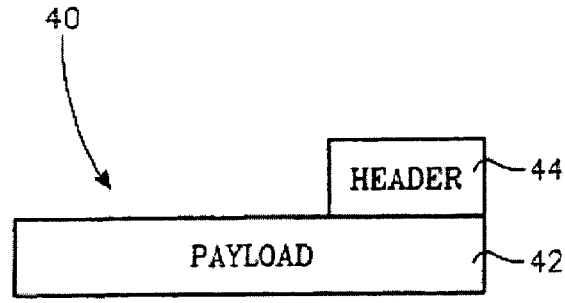
FIG. 3
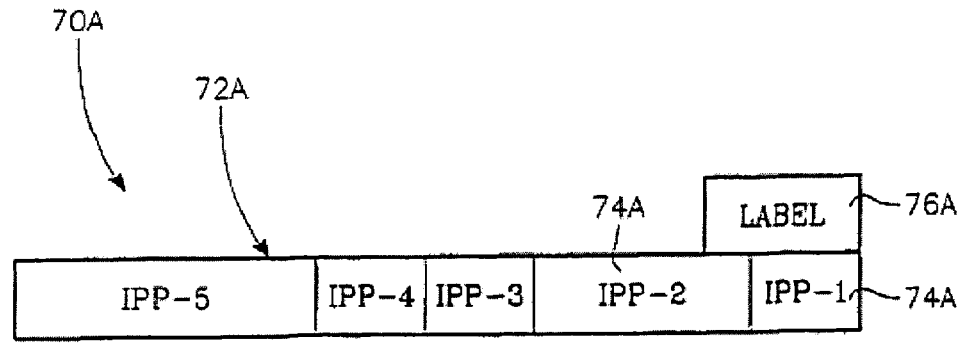
FIG. 4 (Prior Art)
FIG. 6

EDGE ROUTER FOR OPTICAL LABEL SWITCHED NETWORK

RELATED APPLICATION

This application is a continuation of pending U.S. patent application Ser. No. 10/341,237, filed 13 Jan. 2003 now U.S. Pat. No. 6,940,863. This application hereby claims priority under 35 U.S.C. §120 to the above-listed parent application.

GOVERNMENT INTEREST

The invention was made with Government support under Contract No. F30602-98-C-0218 awarded by the DARPA-NGI. The Government has certain rights in this invention.

BACKGROUND OF THE INVENTION

1. Field of the Invention

The invention relates generally to switches used in communications networks. In particular, it relates to optical packet-based communication networks.

2. Background Art

An increasing fraction of switched long-distance telecommunications is being performed based on the Internet Protocol (IP). A conventionally conceived Internet-type of communication network 10, as schematically illustrated in FIG. 1, connects multiple terminals 12 through nodes 14 interconnected by bi-directional communications links 16. The terminals 12 can be considered to be ports to other, perhaps different, types of computer networks. The nodes 14 are based on routers which can route sequentially received packets in different directions as the packet propagate through the network 10 from the source terminal 12 to the destination terminal 12. The node routers switch the packets in different directions dependent upon address labels contained in the individual packets.

While IP was originally designed to work with any physical layer transport medium, it was developed for data networks based on electrical cables of different sorts and capacity. Electronic routers are readily and economically available that operate at the speeds of electrical cable, typically about 155 megabits per second (Mb/s) and below.

However, in the same time period in which IP was being extensively implemented, long-distance telecommunication networks have become increasingly based upon optical fiber as the transmission medium. Fiber allows the data rates in a channel to increase to 1 gigabit per second (Gb/s) and even 10 Gb/s, the speeds being limited by the electronics and opto-electronics at the transmitter and receiver. Further increases in speed will be difficult. Nonetheless, electronic routers are available for these data rates.

The total data rate of an optical fiber can be significantly increased by wavelength division multiplexing (WDM) in which a single fiber conveys multiple optical carriers of number W of different wavelength, each impressed with its own data signal. Multiple sets of electronics and opto-electronics operating in parallel at the transmitter and receiver respectively generate and detect the respective optical signals. At the transmitter, the data signal modulates a laser outputting at a selected WDM wavelength, and the different modulated carriers are combined onto the single fiber. At the receiver, an optical detector receives a wavelength-separated WDM channel and converts its envelope to electrical form. Optical means, such as a diffraction grating or an array waveguide grating, can combine or separate the optical signals at the ends of the fiber. Even if the electronics are limited to separate data rates in the low gigahertz range, the fiber throughput or total data rate is W times greater. Some of the earlier WDM systems carried only 4 separate channels, but more advanced systems, referred to as dense WDM (DWDM), have been proposed in which 80 and more WDM channels are impressed on the fiber, thus vastly increasing the total data rate.

Although it is possible to use electronic routers with WDM or DWDM, they do not scale well with increasing number of WDM wavelengths. A router operating with W=32 WDM wavelengths and having K=4 multi-wavelength input ports and K=4 multi-wavelength output ports and operating at 10 Gb/s has a total aggregate switching capacity of 1.28 terabits per second (Tb/s). However, a non-blocking electronic switch needs to connect any input port to any output port regardless of color. Such switching fabric is available in a Clos network, but the power and complexity increases as $(KW)^2$ and $4 \cdot 2^{1/2}(KW)^{1.5}$ respectively. If presently available electronic routers are scaled to 10 Tb/s capacity, the router requires 54 bays of electronics weighing 400 kg and consuming 400 kW of power, clearly an uneconomical design.

In U.S. patent application Ser. No. 10/081,396, filed Feb. 22, 2002 and incorporated herein by reference in its entirety, Yoo describes an optical router relying on wavelength conversion that routes individual packets without converting their payload to electrical form. Its switching fabric 20 is schematically illustrated in FIG. 2. The outputs of K input fibers 22 each carrying W wavelength-separated channels are connected to respective demultiplexers 24 which separate the W WDM signals to be input to respective tunable input wavelength converters 26. Each wavelength converter 26 can be dynamically tuned to convert an input signal at one wavelength to any one of a plurality of wavelengths, preferably of number WK. The wavelength conversion leaves intact any data impressed upon the optical signal. That is, the optical carrier wavelength is changed while the carrier modulation is left intact. A WK×WK wavelength router 28 receives the outputs of the input wavelength converters 26 on its input ports and routes them to any one of its output ports according to its wavelength. That is, the routing is determined by tuning the input wavelength converters 26, and in the described embodiment the wavelength at a router output port is fixed so that tuning the wavelength at the input port to that of the desired output port accordingly routes the signal. The wavelength router 28 can be implemented in an array waveguide grating (AWG), which is a passive optical waveguide structure capable of combining or separating a multi-wavelength optical signal. A WK×WK AWG provides non-blocking switching, but such an AWG having large values of WK is difficult to fabricate. As described by Yoo, however, a number M of smaller AWGs allows a reduction in the number of routing wavelengths by $M^2$, and the AWGs can operate in parallel with different sets of the WDM wavelengths to provide only limited selection of wavelength, and such a design does not markedly increase the blocking at reasonable traffic loads.

The output ports of the wavelength router 28 are connected to the inputs of respective output wavelength converters 30 which convert the optical carrier wavelength associated with that output port to a selected one of the W WDM wavelengths, again without disturbing the data modulation of the carrier. Because both input and output wavelengths at the output wavelength converter 30 are fixed for a particular port, the output wavelength conversion need not be tunable. The tunable and fixed wavelength converters 26, 30 may have the same basic structure, for example, a tunable or untuned laser and a Mach-Zehnder interferometer receiving both the laser radiation and the unconverted but modulated optical signal and outputting an optical signal with the laser wavelength but with the same modulation as the input signal. Optical multiplexers 32 receive the outputs of W of the output wavelength converters 20 and combine them into a multi-wavelength optical signal coupled to an output fiber 34. Both the demultiplexers 24 and multiplexers 32 may also be AWGs although other structures are possible.

For increased traffic capacity, the input wavelength converters 26 should be tunable on time scales on the order of the duration of an IP packet at the intended high data rates, for example, in less than 10 ns. An optical IP packet 40 illustrated in the timing diagram of FIG. 3 includes a payload 42 and an optical header 44. The IP payload 42 is of variable length, for example, up to about 1500 bytes. The IP header 44 on the other hand is typically of fixed length. An IP datagram header 46, as illustrated in FIG. 4, typically has a fixed length of 160 bits (20 bytes) including, among other things, 32-bit source and destination addresses and a datagram length. The source and destination addresses at some level are uniquely identified to each of the users 12. The router includes a lookup table that converts destination addresses to an output path from that router. Both the payload 42 and the optical header 44 propagate together across the IP network. That is, contents of the header 44 determine the switching at each node, which is performed according to the tuning of the input wavelength converters 26. For this reason, the described switching is referred to as optical label switching (OLS). With a few exceptions such as time-to-live counters, the header 44 remains unchanged as it propagates and is switched at intermediate routers together with the associated payload. There are several choices of formatting the optical header 44 relative to the payload 42. The header 44 may precede the payload 42 in a single serial data stream, as in done in conventional electrical signaling. Alternatively, the header 44 may be impressed on a separate WDM wavelength channel used for all the headers propagating from one node to the next so that they accompany the payloads 42 of different wavelengths. Most preferably, as will be explained later for the invention, the header 44 is impressed on a separated sub-carrier modulation channel on the same WDM wavelength channel as the data payload 42 so that each header and payload pair will be transported on the same carrier wavelength.

Such an optical switch is capable of routing a large IP traffic. However, there are some problems in integrating it into a complete IP network. Such an optical router is needed for the high-capacity core of an IP network, for example, the long-distance portion of the network, typically a public network, which interconnects smaller, more local networks. The local networks can continue to use conventional electronic routers. Networks within buildings typically use electrical cables rather than optical fibers, and even point-to-point optical fiber links are easily accommodated with conventional electronic routers. However, we have observed that the optical label switching does not mesh well with electronic routing.

A router must switch IP packets arriving asynchronously from a number of input ports to selected ones of its output ports. Contention arises if two packets arriving from different input links require switching to the same output link. To overcome contention, a router includes a buffer or queue, for example, a first-in/first-out (FIFO) register, which should be large enough to store enough packets for sufficient time that the contention can be resolved. IP networks are stochastic and non-deterministic so that some periods of very high traffic will occur. It is expected that a certain number of packets will be lost because of buffer overflow or other reasons. The system is designed to overcome some loss, but excessive loss becomes unacceptable. Excessive loss is usually associated with congestion in which a node experiences too much contention and the buffers overflow.

An associated problem arises because there may be different attributes of service for different packets, as indicated by an 8-bit field in the header in this example. Priorities may be set according to various and different criteria, for example, a quality of service (QoS) requiring no more than a predetermined maximum loss of data, type of service (ToS), and class of service (CoS). Some time critical applications require no more than a predetermined maximum delay for propagation across the network, also called latency. As described later for the invention, there may be separate output buffers assigned to packets addressed for one destination and having different ones of these attributes. It is understood that a single random-access memory (RAM) may be used for all buffers with pointers to the RAM controlling the queuing.

Electronic buffers are easily implemented in RAM and can be made relatively large. Optical buffers, on the other hand, are not so readily available. The technology of optical RAM has not been sufficiently developed for use in routers. Heretofore, optical queuing has been accomplished in most part by fiber delay lines providing a fixed delay before the payload is inserted into the switch fabric. A 50 m length of fiber introduces about 250 ns of delay, which may be sufficient time to resolve the contention. The delay may be introduced at the input to the router after the header information has been extracted. If necessary, one or more fiber delay lines may link pairs of input and output ports of the wavelength router so that a packet needing additional delay can be looped back from the router output to its input with additional delay introduced. Further, in the wavelength routing described by Yoo, contention may be substantially reduced by the ability to select between multiple wavelength channels linking neighboring nodes.

Nonetheless, it is fair to say that optical label switching of IP packets is more prone to congestion than is electronic switching, primarily because of the limited depth of delay buffers and because of the need to asynchronously accommodate variable length packets without segmenting them as is possible with electronic routers. It is well known that the typical IP traffic on client networks has a distribution of packet lengths that is strongly peaked near 40, 574, and 1500 bytes with almost 50% of the packets having lengths between 40 and 52 bytes. Electronic routers can be fabricated with random access memories easily accommodating this distribution. Nonetheless, when such traffic is combined into a higher-capacity optical core network, the traffic has similar irregular distribution of packet sizes since the auto-correlation function continues to be large for smaller packets even for high traffic. Statistically significant occurrences over short time periods of multiple small packets, that is, high auto-correlation over these periods, necessitate increased buffering. We have determined that such a distribution suffers substantial congestion at optical switching nodes having limited buffering when the optical transmitter load exceeds about 40% of theoretical capacity.

Accordingly, it is desired configure a combination of electronic and optical routing system that does not suffer such incompatibilities.

Another aspect of optical routers utilizing optical label switching is they they provide more than 1000 times greater capacity and speed than conventional electronic IP routers.

Accordingly, it is desired to configure a combination of optical and electronic routers that does not suffer such incompatibilities.

Optical routers are expected to be concentrated in the high-capacity main portion of the Internet backbone. It is desired that this portion of the network be able to accommodate the older, non-IP types of traffic so that separate parallel long-distance networks do not need be built or older local networks do not need to be converted to IP. Examples of more traditional formats include, for example, SONET, which has slotted traffic with successive packets in a fixed length and repetitive frame dedicated to a virtual circuit between clients, and optically switched WDM. IP traffic is often accommodated in SONET networks by placing IP packets in dedicated ones of the repeating SONET time slots. It is desired to easily transfer this source of IP traffic onto an IP network with optical routers.

An associated problem involves IP or other networks which have been provisioned with equipment operating at significantly different data rates. It is desired to provide a standard interface from all these networks to the high-speed core network without needing to upgrade legacy networks to the current standards.

SUMMARY OF THE INVENTION

An edge router interfaces a core packet-based network, such as an Internet-like network, with associated client networks. Although the client networks may be legacy networks or may include electronic routers, the core network is advantageously designed for high throughput with optical routers using optical label switching. An examplary optical router uses wavelength conversion of optical payload, wavelength routing through the router, and control circuitry reading a label sub-carrier multiplexed on the packet.

The edge router sorts packets received from one or more attached client networks into different buffer queues destined for the same egress port of the core network. The sorting and buffering may also be performed according to class or other attribute of service for packets destined to that egress port. Each queue includes a maximum packet size register and a timeout limit register. If either the total length of buffered packets exceed the maximum length or the age of the queue becomes older than the maximum age, the aggregated packet block ingress into the optical core network from the edge router. The routing of the super packets over the core network may take into account these service attributes.

The packets are aggregated and assembled into super packet and a header or label label is attached to the super packet as part of an optical packet. The core network preferably includes optical routers using optical label switching to switch and route the super packets across the core network.

The core network is advantageously designed to have a limited number of ports and to be constrained to a standard architecture and packet format, thereby allowing a short label in association with a relatively long payload. The optical label may be sub-carrier multiplexed onto the optical carrier of the payload. If the network uses wavelength-division multiplexing (WDM) to impress multiple data channels on different optical wavelengths, the optical label may be sub-carrier multiplexed on the respective WDM wavelength conveying the associated payload.

At the egress port, the edge router receives the super packet and disassembles it into its constituent packets for retransmission on the associated one or more client networks according to the packet headed attached to the separate packets.

In one embodiment, the router nodes of the core network are based upon optical routers and optical label switching. The optical router receives the super packet and detects the super label while delaying the optical payload. The output port of the optical router is determined according to the desired egress port in view of possible contention. When the super packet is output from the optical router, a new super label may need to be attached, for example, to update a time-to-live field.

BRIEF DESCRIPTION OF THE DRAWINGS

FIG. 3 is a diagram of a data communications packet, such as an IP packet.

FIG. 4 is a diagram of a conventional header in an IP packet.

FIG. 6 is a diagram of an aggregation of IP packets forming a super packet.

DETAILED DESCRIPTION OF THE PREFERRED EMBODIMENTS

Figure 5:
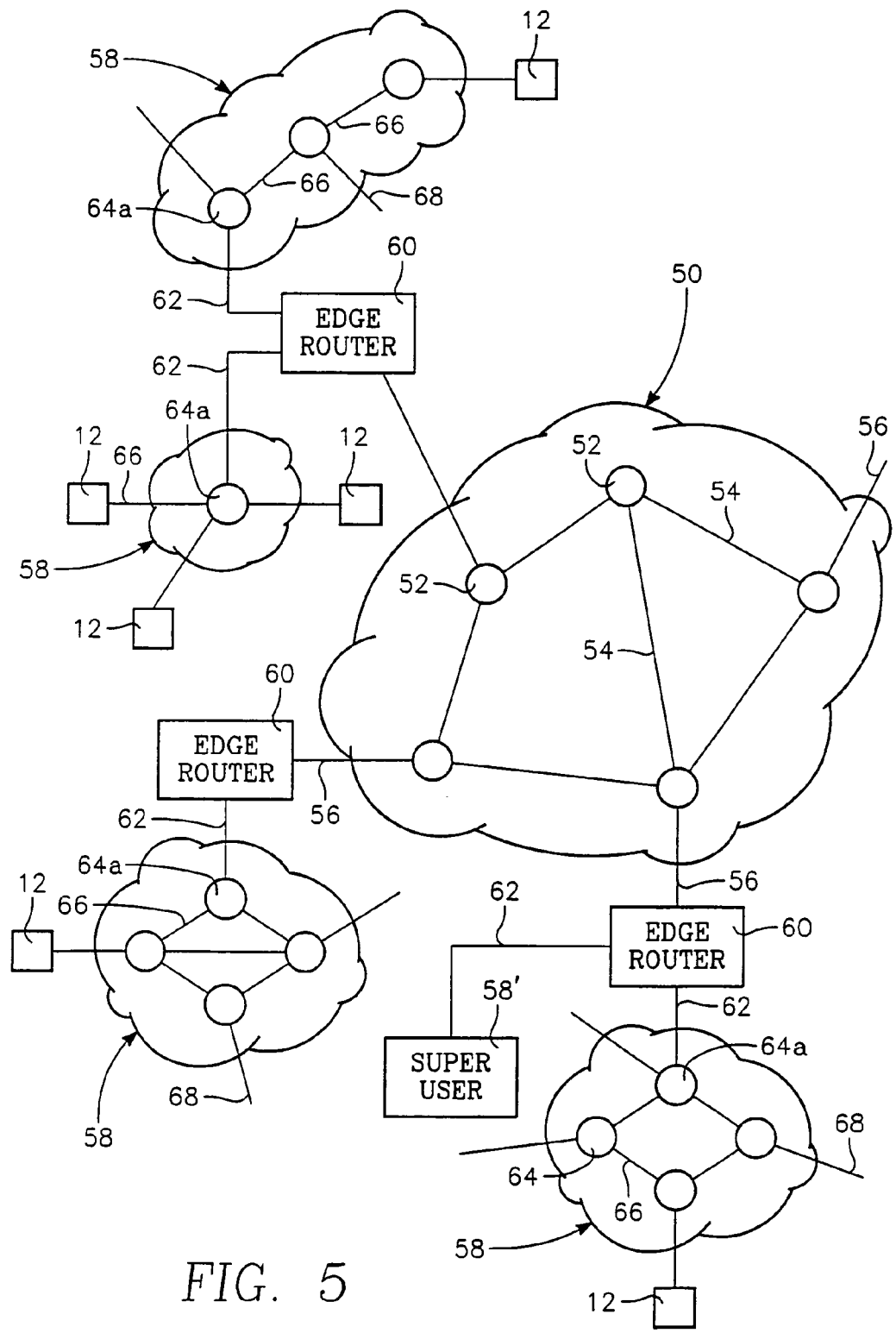
FIG. 5 is a network diagram of a packet-based communications network included within the invention having edge routers linking client networks to a core network.

Although the conventional IP architecture has proven successful in electrical networks and point-to-point fiber networks in which electronic routers are readily and economically available, a more scalable IP network in the future is expected to involve optical label switching (OLS) concentrated in a core network 50 illustrated in FIG. 5, in which optical routers 52 are interconnected by multi-wavelength optical fiber links 54 and can switch packets between the links 54. The optical routers 52 are typically closely associated with edges of the core network 50 and can additionally switch the packets to client networks 58 through edge routers 60. The edge routers 60 are connected to the core network through edge links 56 and to the client networks 58 through client links 62. It is not unusual to have more than one client network 58 or super user 58' connected to a single edge router 58 at a major entry point to the core network 50. The client networks 58 may be IP networks having electronic routers 64 switching electronic packets between internal links 66 and user links 68 to the users 12. However, as will be discussed in detail later, the client networks 58 may be legacy networks based on SONET or asynchronous transfer mode (ATM), and the edge router 60 provides the necessary interface. Alternatively, a super user 58', such as a national super computer center, may be treated equivalently as a client network 58 for purposes of the core network 50 and the edge router 60.

The internal and user links 66, 68 of the client networks 58 may be based on fiber and even use wavelength division multiplexing (WDM). However, in a simple embodiment of the invention the optical signals from the core network 50 are converted to electrical form for entry into the client networks 58 for switching by their electronic routers 64. That is, even if the client, internal, or user links 62, 66, 68 use optical fiber, the packets are converted to electronic form for switching by the electronic routers 64. In contrast, it is preferred that the packets remain in optical form on the core network 50. It is understood that the edge router 60 may be incorporated into a nearest one 64a of the electronic routers 64 and further that the associated optical router 52 is likely to be physically closely adjacent, for example, in a regional hub. Alternatively, the edge router 60 may be incorporated as additional electronics and some opto-electronics into the associated optical router 52. Yet further, the nearest electronic router 64a, the edge router 60, and the associated core router 52 may be formed together. It is further understood that the illustrated topology is overly simplified. It is expected that the core network 50 extends over large geographical expanses and that the client networks 58 will be embedded within holes as well as at external edges of the covered territory. For example, the core network 50 has edges at not only San Francisco and New York but also Kansas City and Denver.

The core network 50 and the client networks 58 are expected to differ in design and performance. The core network 50, as the name implies, forms the core of a large communication network. Its topology may be relatively simple with relatively few ports to the client networks 58. its architecture may be somewhat constrained to conform to a single standard while the client networks 58 and the intermediate edge routers 60 may be more specialized. The performance of the components of the core network 50 may be pushed close to the limit afforded by the current technology since cost is less of a constraint for the core. On the other hand, the client networks 58 are anticipated to much more numerous, serve a more diverse customer base, and have been installed at different times in the development of technology. Cost become a much greater consideration for the client networks 58 so that not only slower electronics may be satisfactory but legacy networks installed in the past may need to be accommodated.

The edge routers 60 need to convert the electrical signal of the client network to the optical signals of the core network 50 and vice versa, but the electronic routers 64 are likely performing all or part of the opto-electronic conversion anyway. More importantly, at the ingress port of the core network 50, the edge routers 60 aggregate IP packets and perhaps other smaller packets into super packets for transmission on the core network 50. The aggregation at one ingress port to the core network 50 is preferably performed to direct an entire respective super packet to one egress port of the core network 50. That is, the super packet is transmitted whole from one side to the other of the core network 50 even if it passes through one or more intermediate optical routers 52. Conversely, at the egress port from the core network 50, the super packets are disassembled into smaller IP packets for distribution within the associated client networks 58. Advantageously, the core network 50 operates similarly to an IP network with OLS switching being performed according to an optical label attached to the super packet. As a result, optical routers and associated optical label switching is concentrated in the core network 50. Electronic routing and TCP/IP switching or other types of electronic routing is performed in the client networks 58. The edge routers 60 are located at the edges between the core network 50 and the client networks 58 and provide the ability to convert the traffic between the two closely related formats for IP packets and aggregated super packets.

The edge router 60 shapes the client traffic for transmission on the core network 50. The shaping includes labeling the traffic for an egress port and also aggregating it into longer super packets. As stated before, IP traffic has strong peaks near 40, 574, and 1500 bytes. Such a large number of short packets having strong auto-correlation easily congest the optical routers having a limited amount of buffering, which typically is consumed on a per-packet basis. Accordingly, the edge router 60 at an ingress port includes substantial electronic buffering which stores the IP packets destined for a specified egress port until a maximum packet size (MPS) is exceeded. A super packet 70A is illustrated in the timing diagram of FIG. 6. It includes a payload 72A of one or more IP packets (IPP) 74A, each of which includes its respective IP packet payload and IP header, which may be in the usual electronic form although timing and framing bits are not required for each one. The IP packets 74A are aggregated until they exceed the MPS length. If the last queued IP packet 74A causes the queue to exceed the MPS length, preferably the last packet is not included in the super packet to be immediately sent but waits for the next super packet. However, other assembly protocols are possible. A super label 76A is generated for the super packet 70A to be sent, which contains importantly the egress port from the core network for which all the IP packets 74A will pass on their way to their intended common client network or at least common egress port. The aggregation shapes the traffic by consolidating most if not all of the short packets into larger packets. That is, the core traffic has a length distribution favoring the longer lengths and with a smaller variance in lengths.

Figure 7:
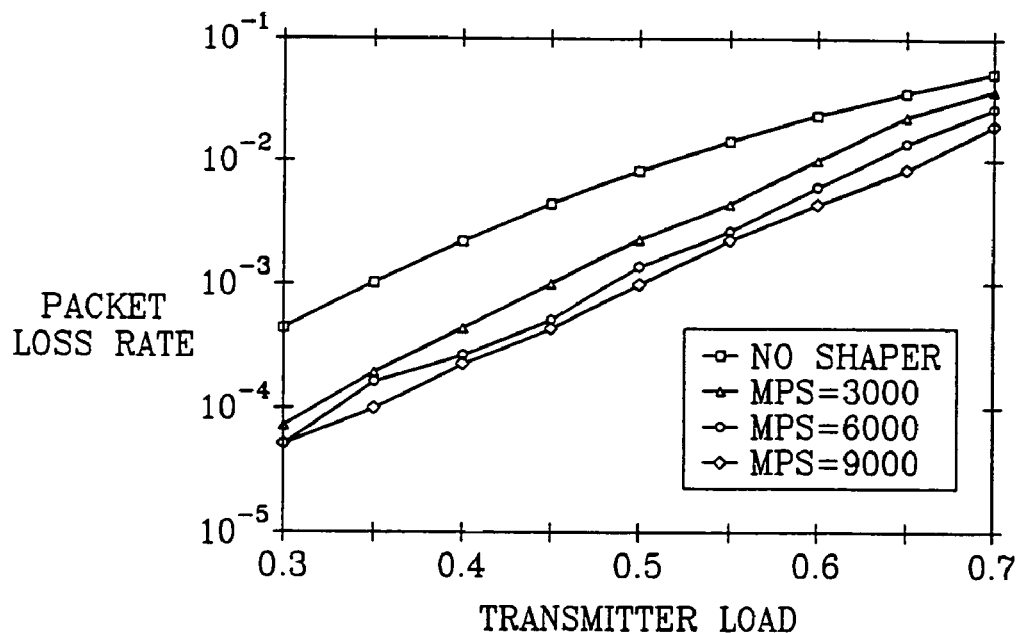
FIGS. 7 and 8 are graphs of packet loss rate and delay respectively as a function of transmitter load for different levels of packet aggregation.
Figure 8:
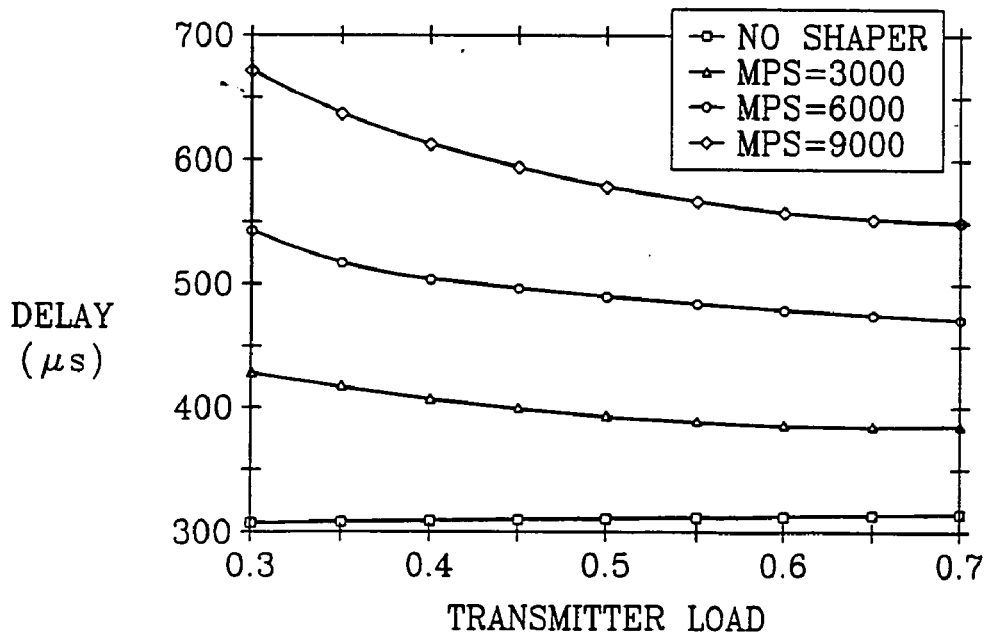

Network simulations have been performed for transmitting typical IP traffic across an OLS network for no traffic shaping (no aggregation) and for different values of MPS from 3000 bytes to 9000 bytes. The packet loss rate as a function of transmitter load is plotted for various parameters in FIG. 7. At low loads, traffic shaping is very effective at reducing packet loss although the absolute losses are relatively small. At higher loads, the unshaped loss rate becomes unacceptably high. In this situation, a relatively large MPS of 9000 bytes is effective at reducing the loss rate by about a factor of four or more. The aggregation does delay the earlier buffered IP packets. The simulation also calculated, as shown by the plots of FIG. 8, the average delay (latency) under the same conditions. The calculated delay includes 300 μs of propagation delay across the network so the traffic shaping delay is that much less. No shaping produces the least delay. At high loads, shaping introduces delays of no more than 250 μs. In any case, large values of MPS increase the average delay, which may or may not be acceptable for various classes of service. Typically, accumulated latency up to to 50 ms is acceptable even for real-time interactive voice or video conferencing.

A class of service may require no more than an agreed maximum delay or network latency. For this reason and among others to reduce the average delay by eliminating the statistical outliers, it is advantageous to trigger assembly and transmission of a super packet not only by exceeding the maximum packet size but also by exceeding a preset timeout limit. That is, the super packet transmits at less than MPS size if the timeout clock is exceeded since the last transmission or alternatively since the reception of the first packet in the existing queue.

Figure 9:
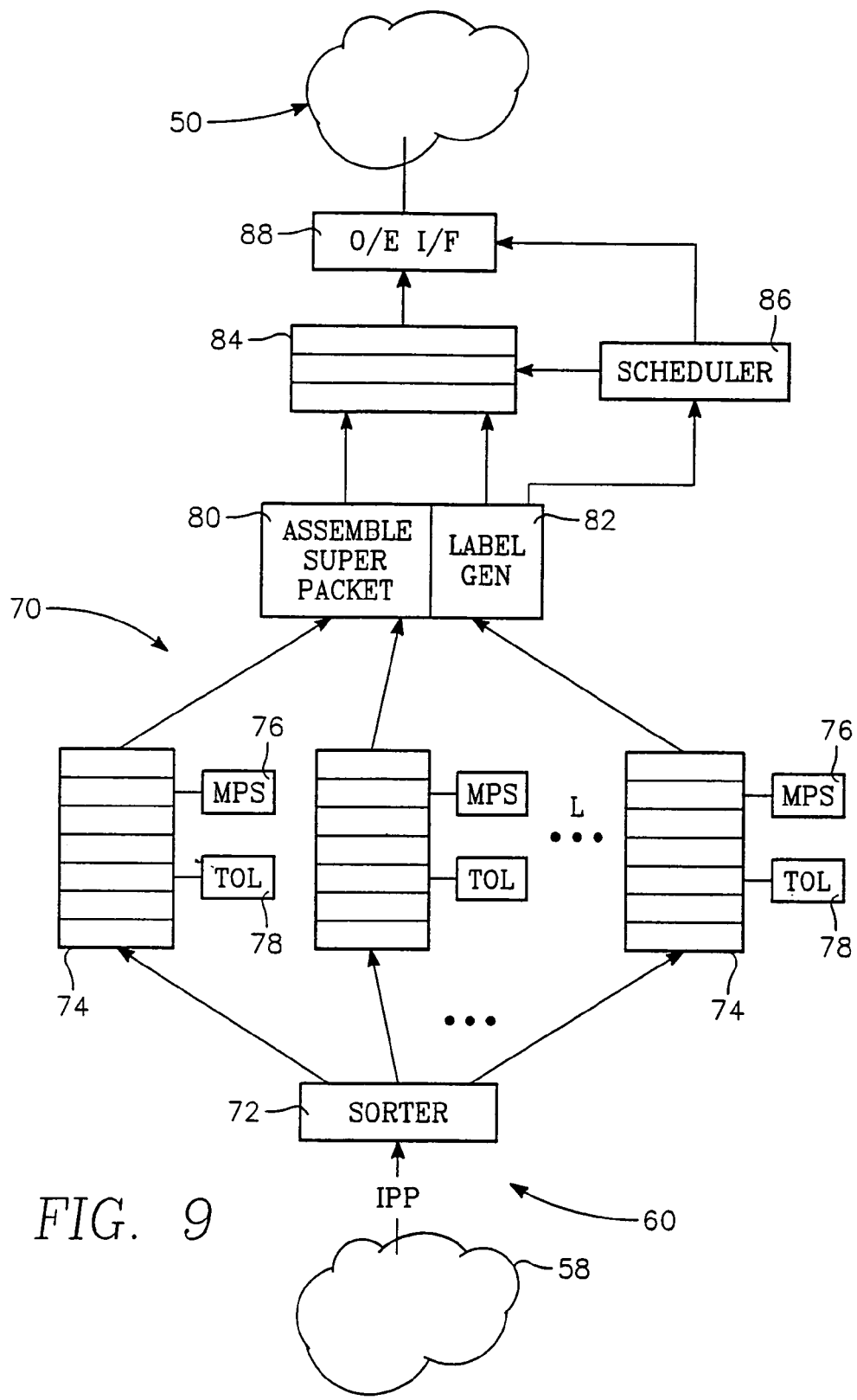
FIG. 9 is a functional diagram of one embodiment of the aggregation part of an edge router.

The acceptable average delay and maximum delay typically vary between various attributes of service including CoS, QoS, and ToS. Accordingly, it is advantageous to buffer the different traffic classes addressed to the same egress port in separate buffers with different timeout limits and perhaps different MPS values. The edge router functionally illustrated in FIG. 9 includes a shaper 70 that shapes traffic according to different classes. A sorter 72 receives IP packets from the client network 58 and sorts them into L different buffers 74. The sorting is done according to egress port from the core network such that all packets in the respective queue 74 destined for the same egress port. Further sorting may be performed according to the attribute of service for packets destined to the same egress port with the same or similarly ranked attribute of service, for example, according to the 8-bit Type of Service in the IP header 46 of FIG. 4. Associated with each buffer 74 is a respective MPS register 76 indicating the maximum packet size for that buffer 74 and a respective timeout limit (TOL) register 68 indicating the timeout limit for that buffer 64. Associated with the MPS register 76 is a counter that sums the lengths of the packets already loaded and being loaded into the respective queue allowing a comparison between the MPS value and the size of the assembled super packet. Associated with the TOL register 70 is a continuously running clock that is initialized for each assembly of packets in the associated queue to determine the age of the queued packets and allow its comparison with the allowed timeout limit.

Whenever the MPS register 76 associated with a particular buffer queue 74 indicates that the maximum packet size has been exceeded or when the corresponding TOL register 78 indicates that the timeout limit has expired, the contents of the associated buffer 74 is transferred to a super packet assembler 80 which includes an optical label generator 82 for generating the super label for that super packet.

The assembled super packet is passed to an output buffer 84 awaiting transmission into the core network 50 over perhaps a limited intervening transmission length. After a particular buffer 74 has for the most part been emptied to the assembler 80, its MPS and TOL registers 76, 78 are reinitialized for yet further super packets. A scheduler 86 receives information about the size, destination, and class of the assembled super packet. It selects a desired color or WDM wavelength for transmission into the core network 50 and accordingly controls an opto-electronic interface 88 outputting a properly labeled optical super packet to the core network 50.

It is understood that the various buffers 74, 84 can be easily formed from one or more large electronic random access memories in which the queue position, class type, and even buffer type are indicated by separate pointers and registers. This is particularly advantageous for the variable length packets and super packets.

Figure 10:
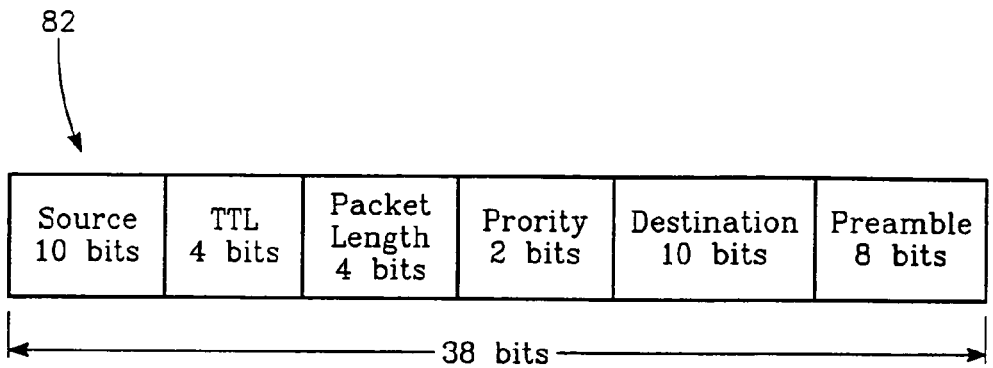
FIG. 10 is a diagram of an example of a label or packet header for a super packet to be transmitted across a core network.

An example of an optical super label 82 is shown in the timing diagram of FIG. 10. It may be characterized as a simplified version of the IP header 46 of FIG. 4 reflecting the relatively limited topology and architecture of the core network. A unique 8-bit sequence is used as a preamble to detect the start of a valid label. Each optical router in the core network detects and interprets the super label and routes the super packet accordingly. Each of the source and destination addresses is allotted ten bits so that 1024 ports can be identified in the relatively simple and constrained topology of the core network. A priority field may be allotted two bits to prioritize transmission at the intermediate optical routers. A relatively coarse grain of four bits is allotted to the length of the super packet. A time-to-live (TTL) field of four bits is initialized to a value, which is decremented (or incremented) at each optical switching node. If the super packet bounces around the core network without reaching its intended destination such that the TTL value reaches zero (or its maximum value), the super packet is abandoned on the network. Abandoning aged super packets prevents the network from becoming cluttered with super packets that cannot reach their destination for some reason, for example, the destination has gone off line without the various schedulers being notified.

The length of the super label 82 of FIG. 10 is substantially shorter than the length of the convention IP header 46 of FIG. 4: Its brevity arises from the relatively few ports on the core network and the constrained and relatively uniform architecture of the core network and its optical routers. At the same time, the length of the payload of the super packet is on average much longer than that of an IP packet and there is less variance in the lengths of the super packets. As a result, little overhead is expended on the optical label, and the router circuitry needed to decode and process the label can be simplified. In particular, even if the payload data rate is 10 Gbs, the label processing circuitry may operate at much lower rates, e.g., 155 Mbs without typically increasing the time slot for the super packet. However, for the occasional short super packet, the payload may need to be padded to allow the slower label to be simultaneously transmitted and not interfere with another super packet.

The operation at the egress port is relatively simple. When a super packet is received, the payload is disassembled into the constituent IP packets of respective payloads and headers, which are then groomed for transmission on a conventional IP network by the addition of preambles and the like and then serially entered into the client network. The super label becomes unimportant at disassembly except for the packet length.

Figure 1:
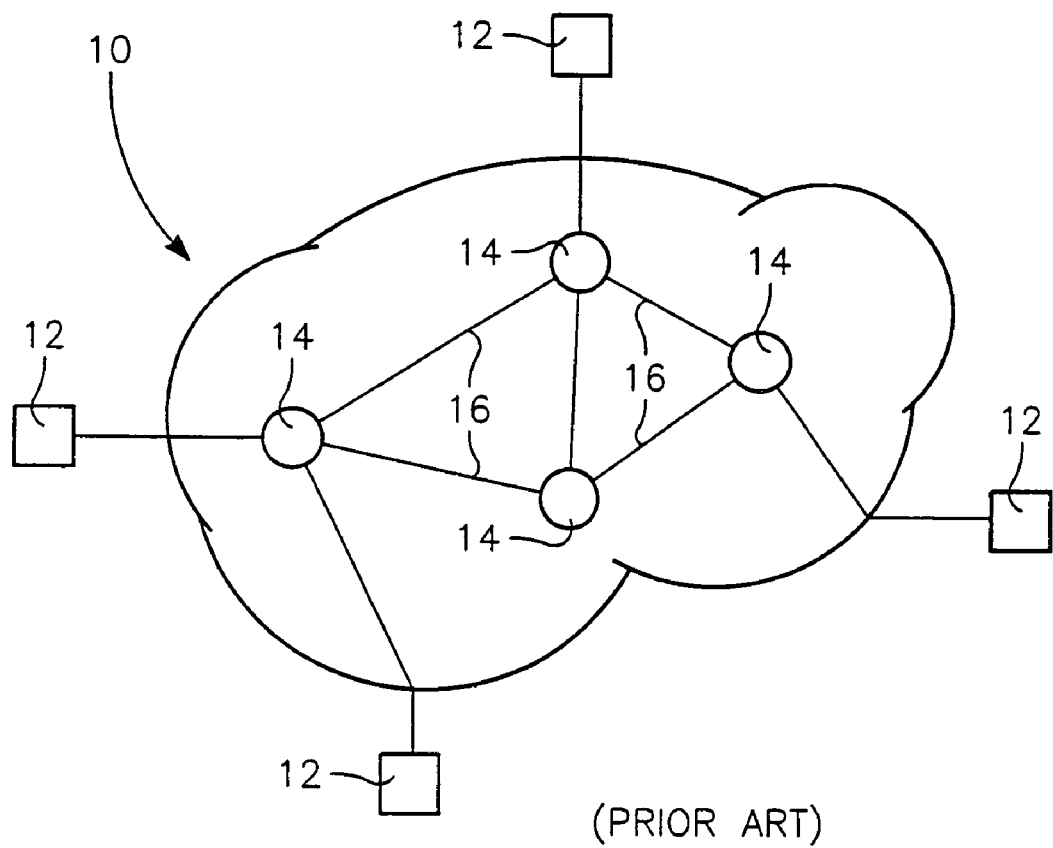
FIG. 1 is a network diagram of a conventional Internet communications network.
Figure 2:
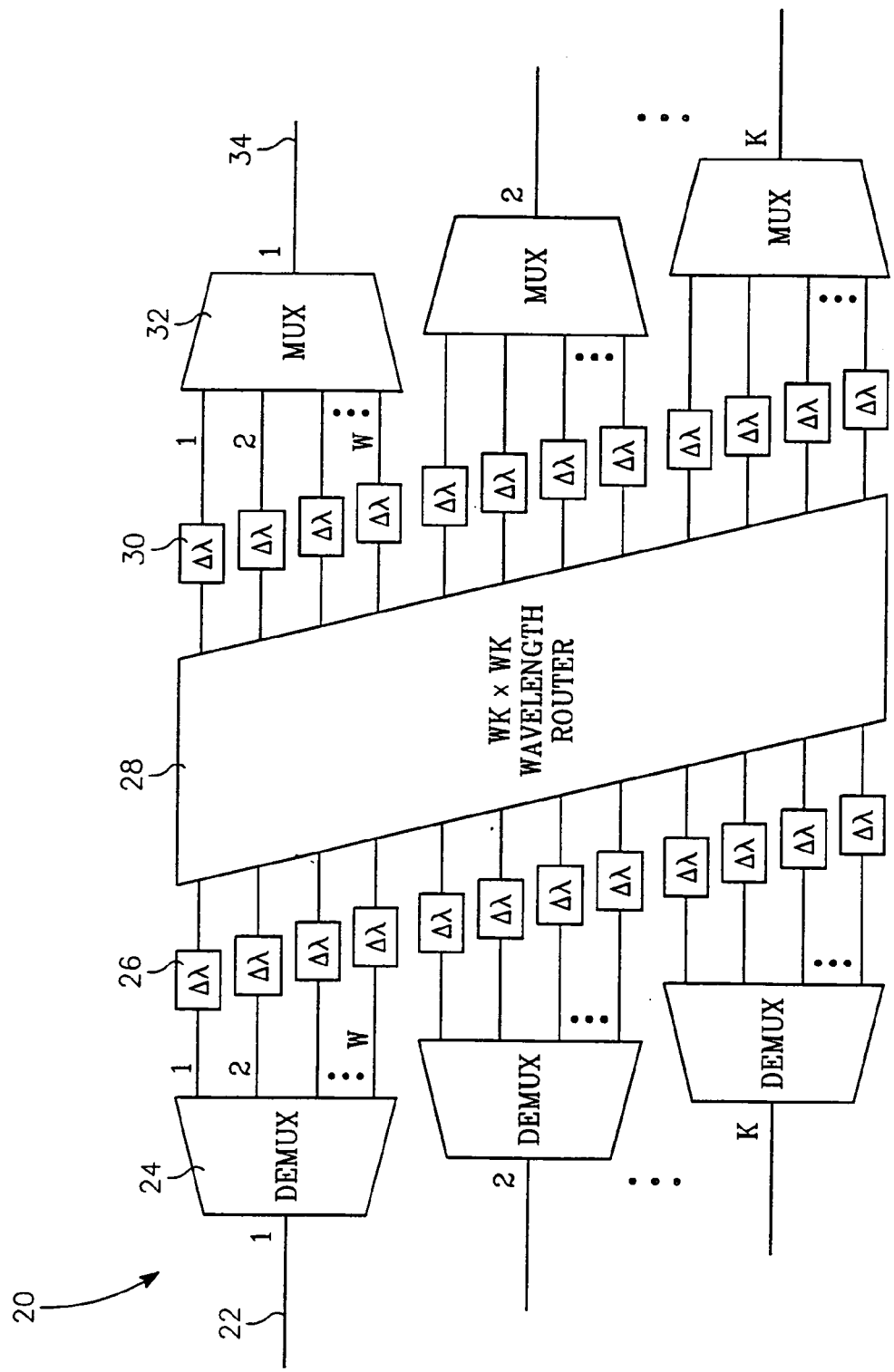
FIG. 2 is a schematic diagram of an optical router relying upon wavelength routing and frequency conversion.
Figure 11:
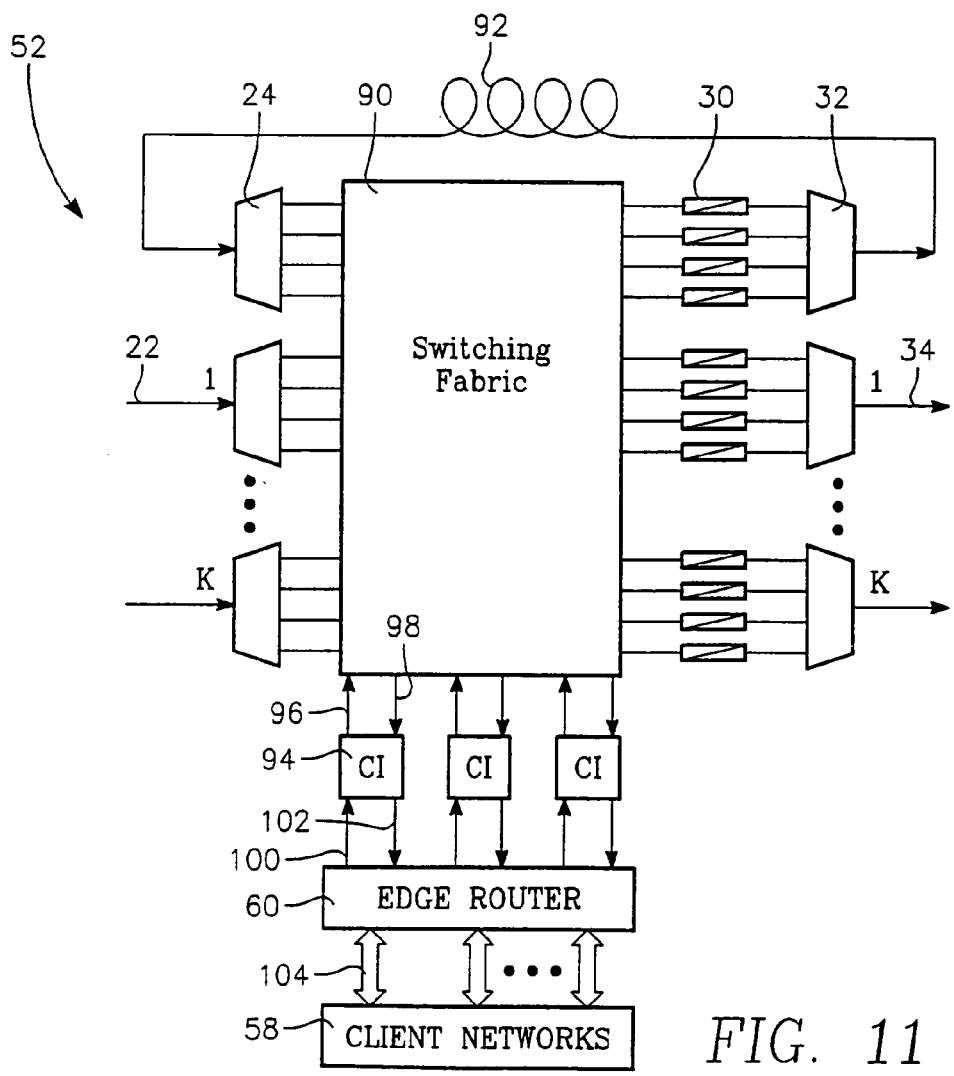
FIG. 11 is a circuit diagram of an embodiment of an edge router.

The combination of some more details of the interaction of the edge router 60 with the associated optical router 52 within the core network is schematically illustrated in FIG. 11. A switching fabric 90 includes the tunable wavelength converters 26 and wavelength router or AWG 28 of FIG. 2. This embodiment includes a fiber delay line 92 delaying several wavelength-separated packets. The length of the fiber delay line 92 should be sufficient to buffer one or more super packets of maximum length, e.g., MPS.

The edge router 60 is connected to the switching fabric 90 through client interfaces 94, each of which has one optical channel 96 connected to an input of the optical router and one optical channel 98 connected to an output of the optical router generally in parallel to the wavelength-separated channels of the input and output fibers 22, 34. Corresponding optical channels 100, 102 connect the client interfaces 94 to the edge router 60. The client interfaces 94 correspond generally to the line cards of a conventional electronic router having one input and one output channel. The optical channels 98, 102 downloading information from the core network to the client networks 58 are often called drop channels, and the optical channels 96, 100 uploading information from the clients networks 58 to the core network are call add channels. The exact form of the Connection is subject to some design freedom. The edge router 60 is in turn connected to the client networks 58 by bi-directional channels 104. The size of the wavelength router needs to be increased beyond WK×WK to accommodate the feedback delay paths and the local drop/add paths to the edge router 60.

The optical router controller assigns a switching wavelength to a super packet intended for this edge router 60 so that it is switched to one of the output ports connected to the client interfaces 94. Similarly, the optical router controller assigns a switching wavelength to a super packet originating from one of the client interfaces 94 so that it is switched to one of the output ports connected to one of the output fibers 34 or possibly the fiber delay line 92. The client interfaces 94 typically include the opto-electronic converters and super label integration for the electronic signals of the edge router 60. If only light traffic is expected to and from this client network, there need be only a single client interface 94. However, multiple client interfaces 94 not only increase the add/drop capacity, they also ease congestion since the color of the add/drop light is not typically important and the buffering is more easily done in the electronic edge router 60 than in the optical router 52. The details of the connection between the edge router 60 and the typically nearby core router may be varied. A conceptually simple design relies on multi-wavelength fiber transmission of super packets between the core router and the edge router 60, that is, the link between the edge and core routers is very similar to a fiber optic link between core routers.

As will be described in somewhat more detail later, the client networks 58 may include a number of distinct client networks, often of different speeds and even formats. For example, they may include packet over SONET (POS) networks, standard TCP/IP or other IP networks, gigabit Ethernet, or 10-gigabit Ethernet. The edge router 60 provides a common interface to the core network and aggregates traffic from all of them for transmission onto the core networks. Client networks of different data rates are simultaneously interfaced to the common core network. FIG. 11 illustrates that the number of drop/add channels between the edge router and the client networks 58 may be of different number than the number of drop/add channels 96–102 between the core network and the edge router 60. In particular, there may be more bi-directional drop/add channels 104 than corresponding drop/add channels 96–102, which is particularly advantageous for the lower-speed client networks 58. In the absence of an edge router, optical traffic from the core network downloaded to a particular one of the multiple client networks 58 is restricted to one or more channels dedicated to the particular client network, that is, to one color. If that channel is already in use, scarce optical memory or degrading deflection must be used or the packet is lost. In contrast, the edge router 60 acts as a common node for all the traffic so that traffic destined for the same particular client interface 104 may be downloaded on parallel drop channels 98, 102, and electronically buffered by the edge router 60 for transmission on a particular bi-directional drop channel 104 to the destination client network 58.

Upload congestion at the edge of the core network typically presents much less of a problem than download congestion, primarily because of the availability of electronic buffering in the edge router 60 and the scarcity of optical buffering in the core network. In some situations, such as subscriber networks providing video-on-demand or asymmetric digital subscriber line (ADSL), download traffic is inherently heavier than upload traffic. For these reasons, although not illustrated in FIG. 11, it is often advantageous to include more or redundant drop channels 98, 102 than add channels 96, 100. This will be discussed further below.

Figure 12:
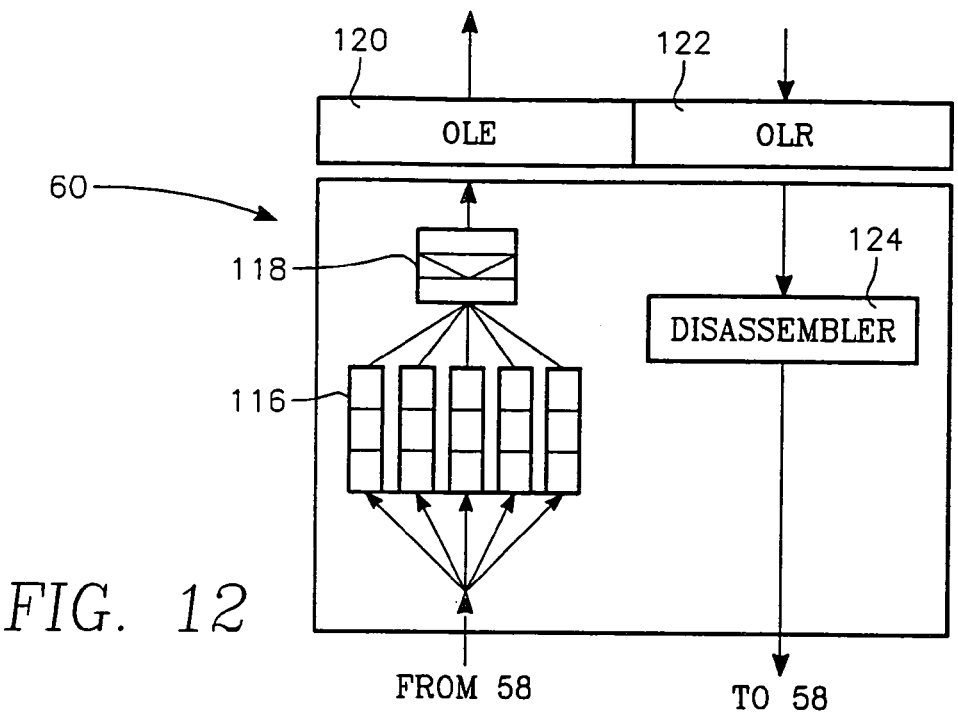
FIG. 12 is a detailed circuit diagram of a part of the edge router of FIG. 11.

The edge router 60 is more functionally illustrated in FIG. 12 to include parallel assembly queues 116 feeding a common output queue 118. Payloads are extracted from the output queue 118, and an optical label encoder (OLE) 120 attaches an optical label as the super packet is passing to the client interface 94. In the receiving direction, an optical label remover (OLR) 92 removes the optical label from a received super packet, leaving its optical payload. After the optical payload has been converted to electronic form, a disassembly module 124 disassembles the super packet into its constituent IP packets. The necessary preamble and framing bits are added before the IP packets are separately put onto the client network. The optical label encoder and remover 120, 122 will be discussed later in more detail since similar elements are required for routing the super packets across the core network.

As shown in FIG. 5, the edge router 60 may in turn be connected to an electronic router 64 of the client network 58 typically through electrical lines 62 since the edge router and associated electronic client router are typically closely positioned and may be formed from the same set of electronics. However, a fiber connection, whether single- or multi-wavelength, may form the link to the client network 58.

FIG. 11 also illustrates that contention can be relieved at the optical router by at least three means. Within the core network, color on super packets transmitted between optical routers is relatively unimportant. A super packet can be converted to any color that is available on a selected output fiber 34 linking the two core routers 52. This is wavelength resolution. Blocking arises only when all colors are used on a selected output fiber 34. A blocked super packet can be delayed in any of the wavelength-separated feedback channels through the fiber delay line 82. This is time resolution. A third case is for the optical router scheduler to transmit the blocked super packet on an available secondary or alternate path into other parts of the core network. Any available output path may be used, but time to live then becomes a problem unless more intelligent alternate routing is employed. The alternate routing is spatial resolution, also called deflection. If, in very rare instances, the above wavelength, time, and space domain contention resolution fails to resolve the contention, a super packet blocked from switching between input and output fibers 22, 34 may instead be dropped at the local edge router 60 through one of the client interfaces 94 and easily buffered in electronic memory at the local edge router 60 before being reinserted onto the core network. This is a very effective method of resolving the contention rather than simply discarding the super packet. It also provides a means to selectively achieve packet regeneration to clean up the optical signal and, in some cases, to reset the time-to-live field and to reinsert the super packet back into the core network.

Optical labels offer many advantages for the aggregation of IP traffic onto the core network. Not only may a single label apply to a larger number of IP packets, but the label information may be considerably condensed because of the relative simplicity of the core optical network. As a result, the traffic overhead for labels is significantly reduced. However, attaching optical labels to an optical payload, particularly an aggregated payload, presents some difficulties.

It is possible to serially position a super header at the beginning of an aggregation of a large number of packets in a time-multiplexed sequence, that is, to use a conventional packet architecture. While this architecture is effective at reducing the overhead at intermediate routers because of the aggregation of multiple IP packets, it does not address the difficult instrumentation problems at the routing nodes. An optical core router needs to decode and process a relatively simple label, but the lengthy high-speed payload needs not be detected. Using the same data rates for the label and the payload imposes severe design constraints on the electronics of the core router.

Placing the header or label out of the principal serial data channels offers many advantages, particularly available in multi-wavelength communication systems. The above referenced patent to Yoo describes a sub-carrier multiplexed control wavelength distinct from the WDM data wavelengths for carrying the control information for the wavelength-separated data channels. While this architecture is effective in some simple situations, it does not address the operational difficulty of separating and recombining labels when the associated packets are destined for the same destination. Furthermore, the separate control channel may provide excessive capacity for the optical labels of aggregated traffic since the labels within the core network are simple and relatively short compared to the constituent IP labels in the more numerous aggregated packets.

Accordingly, efficient optical labeling is performed by sub-carrier multiplexing the label onto the optical payload signal. That is, each WDM channel carries both an optical payload and an optical label that is sub-carrier multiplexed with the payload. For these reasons, it becomes apparent that attaching a separately frequency-multiplexed optical label to a single super packet offers significant operational efficiencies. Furthermore, the sub-carrier multiplexing allows the label data rate to be significantly lower than the payload data rate, for example, 155 Mb/s versus 10 Gb/s, such that most of the control electronics in the core router need not be designed for RF speeds. The disparity of label and payload data rates is consistent with the short super label and the usually long payload.

Figure 13:
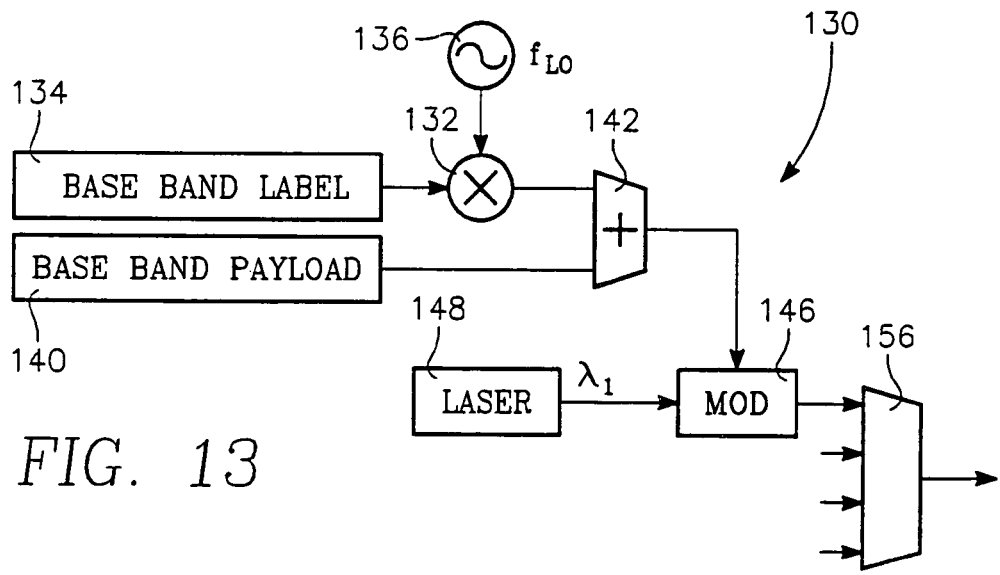
FIG. 13 is a circuit diagram of an example of sub-carrier multiplexer.

An optical label encoder 130 schematically illustrated in FIG. 13 may be used as the optical label encoder 90 of FIG. 12 between the edge router 60 and the core network. An RF mixer 132 receives a base band label 134 and a local oscillator signal from a fixed RF source 136 operating at a local oscillator frequency $f_{LO}$. The base band label 134 may have a data rate of 155 Mb/s while a base band payload 140 has a data rate in the multi-gigabit range desired for the core network, for example, 2.5 or 10 Gb/s. The local oscillator frequency $f_{LO}$ needs to be larger than the data rate at least the label bit rate so that a value of 12 GHz or above is appropriate for a 10 Gb/s payload rate and a 155 Mb/s label rate. Clearly, for a 2.5 Gb/s payload rate, a 10 GHz local oscillator will suffice. An RF combiner 142 receives the output of the mixer 132 and the base band payload 140, that is, the electronic version of the super packet of aggregated IP packets. An optical modulator 146 is controlled according the combined RF signal to modulate the intensity of a laser 148 outputting at one wavelength $\lambda_j$ used in the WDM network. The modulator 146 may include a waveguide structure with an active region composed of $LiNbO_3$.

Figure 14:
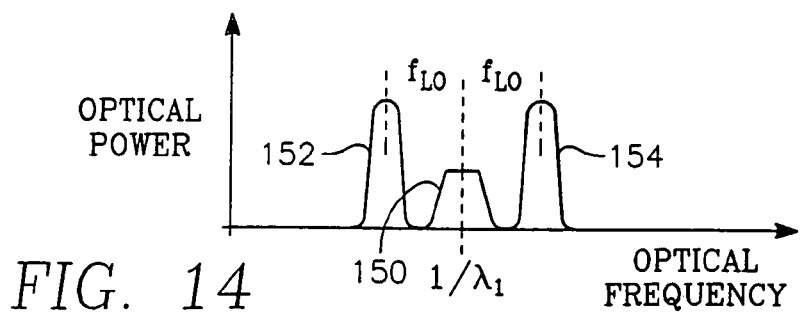
FIG. 14 is a spectrum of a packet including a payload and a sub-carrier multiplexed label.

The resultant optical signal on the output of modulator 146 is illustrated in FIG. 14. Optical payload data 150 occupies a narrow band near the frequency corresponding to the laser emission wavelength $\lambda_j$. Two sidebands 152, 154 separated from the payload 150 by the local oscillator frequency $f_{LO}$ each carry the optical label. At an optical wavelength of 1550 nm, a frequency of 10 GHz corresponds to a wavelength shift of 0.08 nm so that any optical filtering or multiplexing of the WDM super packets must have a pass band sufficient to include the sidebands. Referring back to FIG. 13, depending upon the application and traffic load, replicated versions of this circuitry include lasers 148 with respective emission wavelengths $\lambda_i$ selected from the set of WDM wavelengths. An optical combiner 156, such as an AWG, optically combines the labeled super packets into a multi-wavelength signal.

Figure 15:
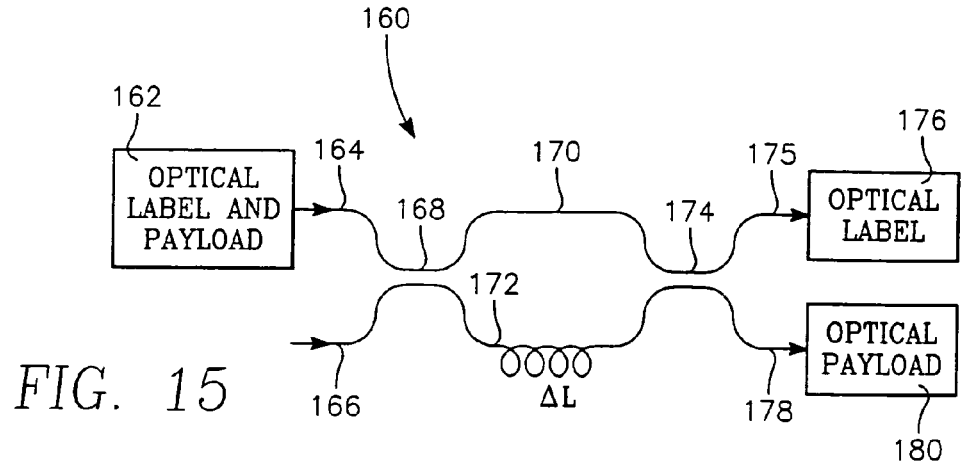
FIG. 15 is a diagram of an example of a circuit for separating an optical payload from its sub-carrier multiplexed label.

An optical label remover 160 illustrated in FIG. 15 is based on a Mach-Zehnder interferometer and is further effective at separating the label and payload into different optical paths, that is, to operate as a payload/label separator (PLS). A combined optical payload and label 162 are input into an input of a first optical waveguide 164 while the input of the other optical waveguide 166 is left unpowered. The two waveguides 164, 166 are brought close together in an interaction region 168 that exchanges power between the two waveguides. The length of the interaction region 168 is chosen such that it acts as a 3 dB coupler, that is, both waveguides 164, 166 at the end each contain equal fractions of the input signal. The two waveguides 164, 166 are then separated into respective arms 170, 172 having optical lengths differing by a predetermined difference ΔL corresponding to the local oscillator frequency $f_{LO}$, which is about 2 cm at 10 GHz. The two waveguides 164, 166 with the delayed and undelayed signals enter another 3 dB interaction region 172 before separating into an output 175 for the optical label and an output 178 for an optical payload 180. The path difference ΔL causes the nulls of the two outputs 175, 178 to be separated by the sub-carrier modulation frequency $f_{LO}$ to thereby suppress the optical payload on the optical label output 175 and suppressing the optical label on the optical payload output 178. Lee et al. describe similar technology in "A simple all-optical label detection and swapping technique incorporating a fiber Bragg grating filter," *IEEE Photonics Technology Letters*, vol. 13, no. 6, June 2001, pp. 635–637 and "Simple, polarisation-insensitive SCM signal extraction technique for optical switching systems applications," *Electronics Letters*, vol. 37, no. 20, 27 Sep. 2001, pp. 1240, 1241. Yoo also describes this technology in published U.S. patent application 2002-0131114-A1.

The base band label modulation is slow enough that square law photodiode optical detectors may be used to detect the optical label and convert it to electronic form. On the other hand, the separated optical payload is typically left in optical form for routing through the core network. As a result, after the combined optical signal is wavelength-demultiplexed and electronically detected, an electronic high-pass filter may pass the label to label processing circuitry while a low-pass filter may pass the payload to local data channels.

The description above is applicable to wavelength-separated super packets. However, the single circuit 160 is effective at separating all the labels and payloads from a multi-wavelength input if the WDM or other optical frequency separation $\Delta f_0$ is an integral multiple of the local-oscillator frequency $f_{LO}$. The combined optical labels after separation from the optical payloads would then require optical wavelength separation before detection.

Figure 16:
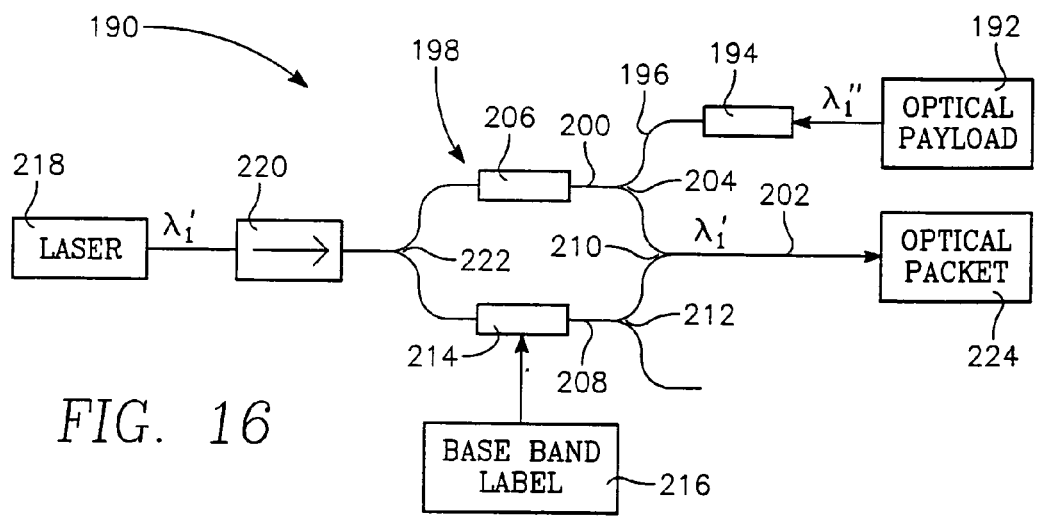
FIG. 16 is a diagram of an example of a circuit for sub-carrier multiplexing a label on an optical payload.
Figure 17:
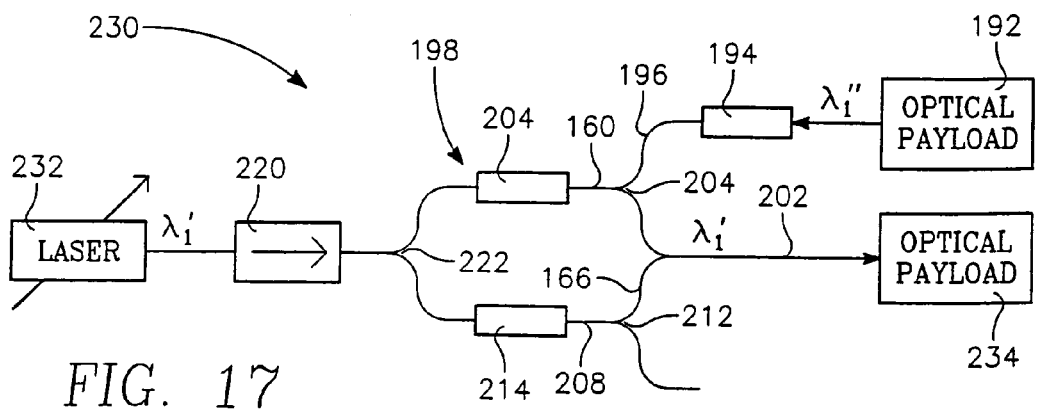
FIG. 17 is a diagram of an embodiment of a circuit for converting the carrier wavelength of an optical payload.

The payload/label separator 160 may also be used in the core network for extracting the labels for controlling the switching of the optical payloads through the wavelength router. In that case, the optical label encoder can be combined with the fixed wavelength converter 30 of FIG. 2. In an output wavelength converter 190 illustrated in the schematic diagram of FIG. 16, an optical payload 192 after switching by the wavelength router and having an optical carrier wavelength $\lambda_i''$ used in the wavelength routing fabric enters a semiconductor optical amplifier 164 formed in a data input waveguide 196. A Mach-Zehnder interferometer 198 includes a first waveguide arm 200 coupled on the same side to both the semiconductor optical amplifier 194 and an output waveguide 202 through a first 3 dB Y-shaped splitter 204. The first waveguide arm 200 includes an active region 206, which is preferably a diode waveguide reversed biased into avalanche, although it may more conventionally be forward biased to act as a semiconductor optical amplifier. Yoo describes the advantages of biasing into avalanche in U.S. patent application Ser. No. 09/828,004, filed Apr. 6, 2001, now published as US-2002-0186453-A1. The interferometer 198 also includes a second waveguide arm 208 coupled to the output waveguide 202 through a second 3 dB Y-shaped splitter 210 oriented opposite the first one. A third 3 dB Y-shaped splitter 212 oriented the same as the first one 204 is also disposed in the path but discards its output. The second waveguide arm 208 includes another active region 214 preferably reversed biased into avalanche and further modulated by an electrical base band label 216. A fixed-wavelength laser 218 emits a CW optical signal at the desired WDM wavelength $\lambda_i'$. A distributed feedback diode laser may be used for the laser 218. Its output is coupled through an isolator 220 and another 3 dB Y-shaped splitter 222 into both arms 200, 208 of the interferometer 198. The isolator 220 prevents the unabsorbed $\lambda_i''$ radiation from entering the laser 218 and potentially inducing oscillations in it. The interferometric structure causes the optical payload 192 to change its carrier wavelength from $\lambda_i''$ to $\lambda_i'$ and to further sub-carrier multiplex the label 216 on the latter wavelength, thus outputting an optical packet 224 on a carrier wavelength $\lambda_i'$. The counter propagating orientation in which the radiation at the two wavelengths $\lambda_i'$ and $\lambda_i''$ propagate in opposite directions through the active region 206 allows self-conversion, that is, $\lambda_i'=\lambda_i''$ A similar arrangement can be used as the wavelength converter 26 of FIG. 2 at the input to the wavelength router 28. As illustrated in FIG. 17, a wavelength converter 230 includes a tunable laser 232 emitting a CW signal any wavelength $\lambda_i'$ of the routing wavelength set. An example of its structure is described by Yoo in the above cited patent application. Reverse biasing of the active regions 204, 214 into avalanche allows wavelength tuning in the order of nanoseconds. The input optical payload 192 is carried on one WDM wavelength $\lambda_i''$, and its optical label has already been removed. An output optical payload 234 has the same data as the input optical payload 192 but is carried at the router wavelength $\lambda_i'$ rather than the WDM wavelength $\lambda_i''$. No label encoding is required.

The overall design of the core router is mostly based on the optical router described by Yoo in the first above cited patent application but some differences increase performance in aggregated core networks. A simplified core router 240 schematically illustrated in FIG. 18 treats the feedback fiber delay line 92, an add fiber 242, and a drop fiber 244 to the edge router 60 as nearly equivalent to the WDM input and output fibers 22, 34 links within the core network. The network diagram shows K input and K output fibers 22, 34 each carrying W WDM channels. Only two feedback channels and two drop/add channels at respective wavelengths are illustrated. The optical signals from the feedback fiber 92, the core network input fibers 22, and the add fiber 242 are received by respective optical payload/label separators 246 for example, the separations 160 of FIG. 15. These optical signals are optical super packets including both optical payloads and associated sub-carrier multiplexed optical labels. The payload/label separators 246 separate the optical payload from its label. The labels are directed to receivers 248, which detect the multiple labels from the multi-wavelength input and converts them to electrical signals for a controller system 250 which determines from the each label which egress port from the core network the super packet is directed or whether the super packet should be dropped through the associated edge router 60 to the client network 58. On the other hand, the optical payloads are directed to respective fiber delay lines 92 which provide sufficient delay for the controller system 250 to receive and decode the associated labels and to set up the switching before the payload reaches the demultiplexers 44.

The controller system 250 controls the switching direction through the router 240 by tuning the wavelength of the wavelength converters 180, as described with reference to FIG. 16, before the associated super packet payloads reach them through the demultiplexers 44. A look up table 252 contained in the controller system 250 associate each of the egress ports from the core network with a primary output fiber 34. The look up table 252 may additionally list a secondary output fiber 34 to be used when the primary one is blocked. The controller system 250 can select an available one of the colors on the selected output fiber 34. If no space is available on the desired output fiber 34, the controller system 250 may instead direct the super packet to the feed back fiber 92 or may deflect it on an alternate path on the secondary output fiber 34 into the core network. In any case, the controller system 250 tunes the input wavelength converters so that the wavelength router 48 routes the super packet payload to one of its output ports. Respective fixed wavelength converters 190, as described with reference to FIG. 15, receive the optical payloads from the wavelength router 48, convert their carrier wavelength, and sub-carrier multiplex the associated labels provided by the controller system 250.

It is understood that the drop/add signals to the edge router and the feedback signals do not need to include the optical labels since the corresponding labels already exist in electronic form in typically closely spaced equipment.

Figure 18:
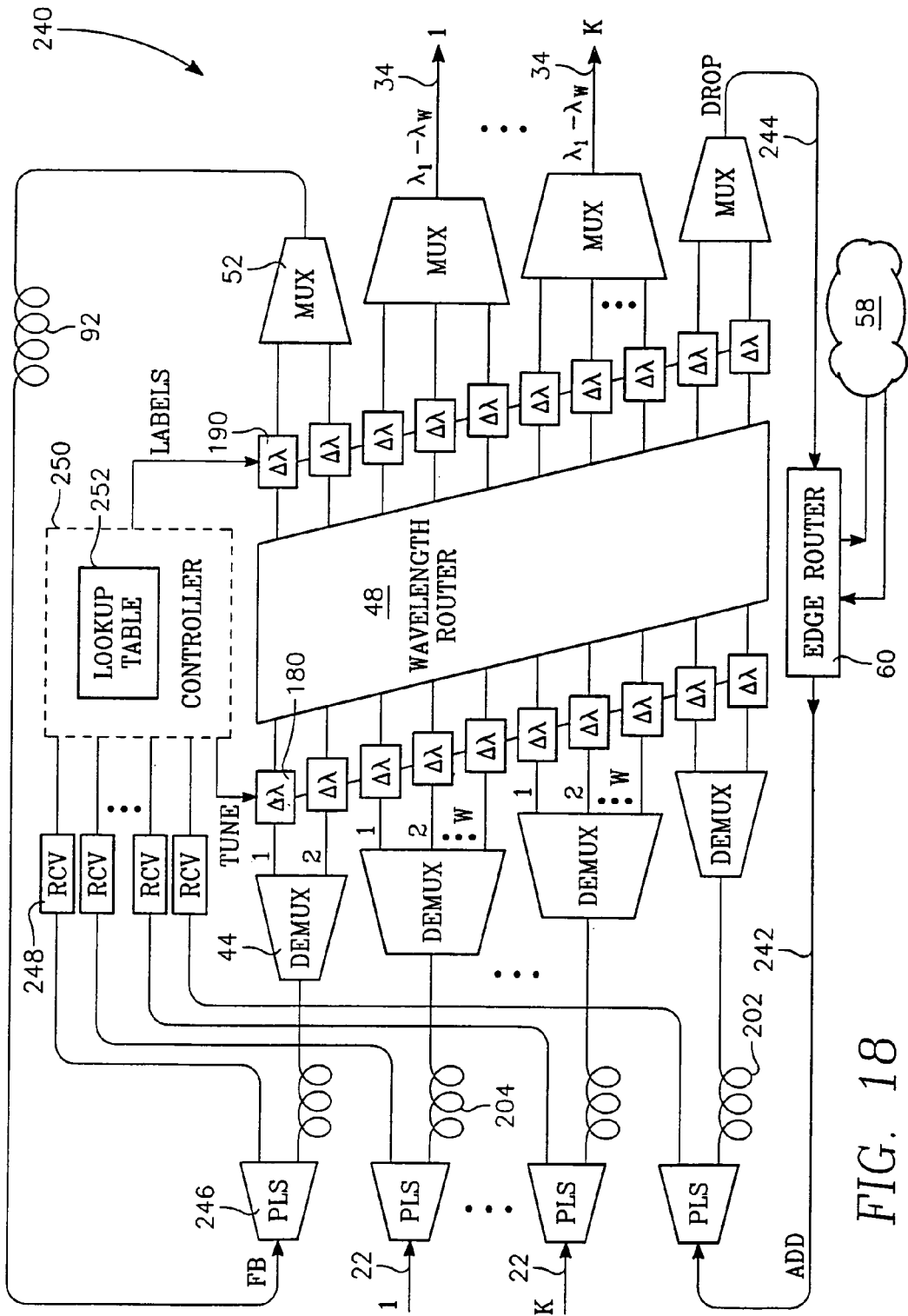
FIG. 18 is an exemplary circuit diagram of an optical router and associated edge router.
Figure 19:
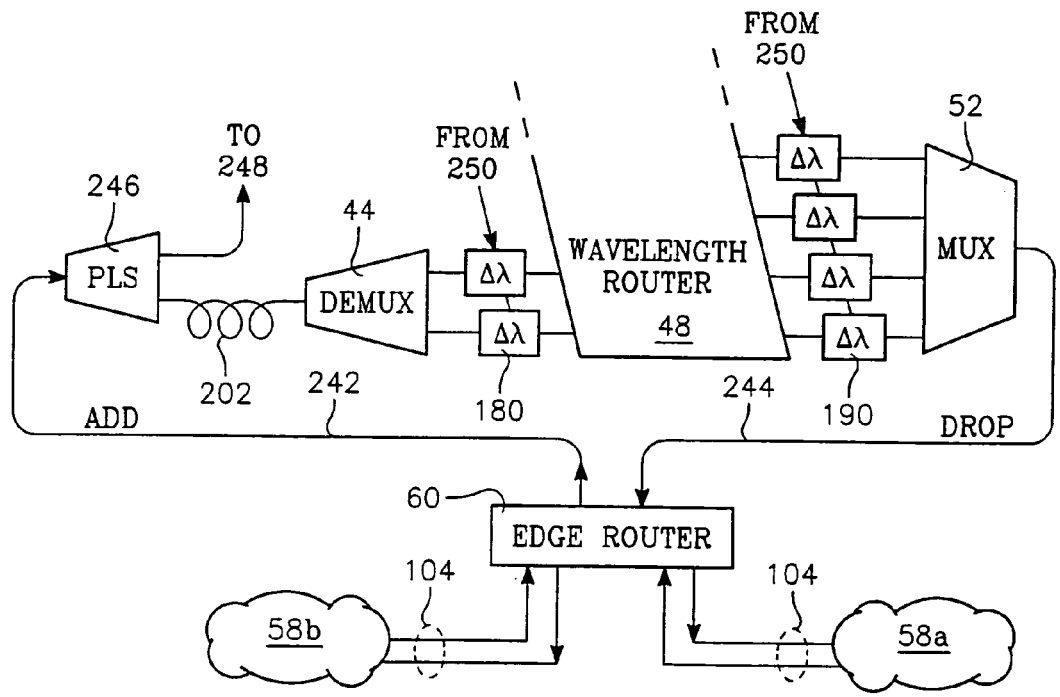
FIG. 19 is a circuit diagram of a variant of a portion of the optical router and edge router of FIG. 18.

The system of FIG. 18 uses, by way of illustration, two wavelength drop channels and two add channels between the edge router 60 and the core router. Multiple drop or add channels significantly decrease the loss of packets at the interface between the client and core networks because of the alternate routing they afford. Furthermore, an increased number of drop channels relative to the number of add channels more effectively utilize a limited wavelength-routing capability. As illustrated in the partial network diagram of FIG. 19, two distinct client networks 58a, 58b are connected to the core network through the edge router 60 by respective bi-directional channels 104, which may be electrical or optical. The wavelength drop channels from the wavelength router 48 do not need to be identified with a particular client network 58a, 58b when packets for that network are being downloaded. Designating a particular client network 58a, 58b by the wavelength of the downloaded super packet or other WDM signal may severely increase contention since no alternate path is available to the edge router 60 and/or the designated client network 58a, 58b and optical buffering is not readily available. In contrast, since multiple optical drop channels are available and electronic buffering is available at the edge router, blocking is substantially reduced.

Further, even disregarding the possibly higher data rates on the core network, it is advantageous to include more drop channels from the core network to the edge router 60 than add channels in the opposite directions. The edge router 60 may be designed with sufficient electronic buffering to buffer in both directions. An asymmetry factor r is defined as the ratio of wavelength drop channels to add channels. Its optimum value may be determined by careful analysis of the traffic matrix, the network topology, and the routing protocols. A value of r=2 has been shown to greatly reduce the packet loss rate, but other values greater than 1 may be chosen.

Figure 20:
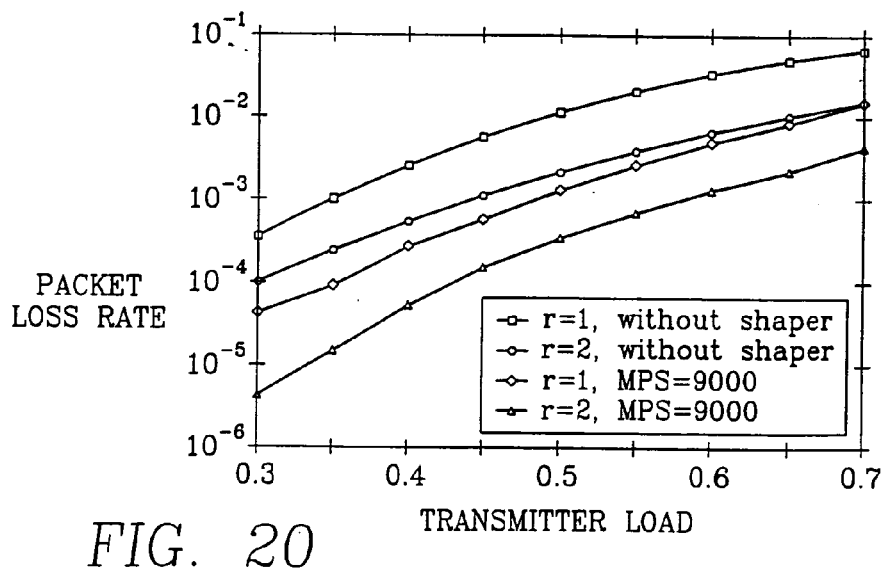
FIG. 20 is a graph of packet loss rate as a function of transmitter load for two different ratios of the numbers of drop channels to add channels and with and without packet aggregation.

Networks simulations have been performed based on N=4 clients at the port to the core network, that is, four client networks connected to the edge router. In the simulation, each client machine uses data bit rates identical to the date bit rate on one of the WDM channels in the core network, in this case 2.5 Gb/s. Normally, this will require four add ports with four transmitters and four drop ports with four receivers at the edge router. We have compared this simulation with the case where an asymmetry factor of r=2 is used, i.e. eight receivers and four transmitters. The calculated packet loss rates are plotted in FIG. 20. When eight receivers and four transmitters are used, the packet loss rate is considerably reduced over the symmetric configuration of four receivers and four transmitters. The simulation also shows the effect of traffic shaping, the advantage of which becomes less pronounced at higher transmitter loads, mainly because the raw input traffic is less burst at the higher loads. The combined benefit of the edge router is approximately a factor of 100 measured in terms of packet loss at a load of 0.5.

It is possible to overlay in a same physical fiber network the described core packet networks with a more conventional WDM networks using fixed circuits or other optically based network. Some WDM wavelengths are assigned to the packet network and others to the packet network. Multiplexers and demultiplexers at the switching nodes separate the circuit and packet traffic to different switching circuitry. For example, the demultiplexers 44 and multiplexers 52 of FIG. 5 may have their multi-ports connected not only to the wavelength router 48 but also to more conventional switching circuitry, whether all-optical or electronically based. WDM routing in a semi-transparent network may be accommodated by assigning certain input and output ports of the wavelength router to non-packet traffic and using wavelength converters that are semi-permanently fixed. Further, the circuit switching may use conventional electronic switches, for example, with SONET loads, or rely on all-optical switching of the entire wavelength channel.

Although the invention has been described with primary reference to IP packets, other packet protocols, particularly those employing packets of variable length, would benefit from the invention.

The invention provides for a high-capacity communication network without the necessity of upgrading all portions of the network. It also decreases blocking at optical routers in a label switched communications network.

The invention claimed is:

1. An edge router positionable at the interface between a first packet network and a second optical label switched packet network having a plurality of ports including the port at which said edge router is positionable, comprising:
    a plurality of buffers associated with respective ones of said ports for buffering packets received from said first network and intended for transmission to a respective egress port of said second network;
    maximum packet size registers respectively associated with each of said buffers for determining when the associated buffer has reached a respective maximum size for length of buffered packets;
    timeout limit registers respectively associated with each of said buffers for determining when an age of packets buffered in the associated buffer register has reached a maximum time; and
    an assembler triggerable by either of the maximum packet size register or the timeout limit register of any one of said buffers to assemble the packets buffered into said any one buffer into a super packet, encoding an optical label onto said super packet indicating which of said ports said super packet is to be routed on said second network, and transmitting a resultant optical super packet onto said second network.

2. The edge router of claim 1, wherein said plurality of buffers includes a sub-plurality of buffers for buffering packets intended for transmission to a same egress port with respectively different classes of services.

3. The edge router of claim 2, wherein respective timeout limit registers are associated with each of said sub-plurality of buffers.

4. The edge router of claim 1, wherein said packets include first payloads and respective headers.

5. The edge router of claim 4, wherein said super packet include said first payload and said respective header and further include said optical label.

6. The edge router of claim 5, wherein said first payload and said respective header modulate an optical carrier wavelength and said optical label is sub-carrier multiplexed on said optical carrier wavelength.

7. A communication network system, comprising:
    a core network having a plurality of first ports associated therewith and providing optical label switching on a plurality of wavelength division multiplexing wavelengths of packets from any of said first ports to any other of said first ports;
    a plurality of client networks each providing switching of packets between any of second ports associated therewith;
    edge routers connecting said core network to respective ones of said client networks through one of said first ports and one of said second ports, each said edge router including:
    a plurality of buffers for queuing packets received from said respective one client network and destined for respective ones of said first ports of said core network, each buffer including a maximum packet size register for determining when said each buffer has queued packets to a maximum length and a timeout limit for determining when one of said packets queued in said each buffer has reached a maximum time limit in said each buffer;

an assembler triggerable by any one register of the maximum packet size registers and the timeout limit registers for assembling packets associated with said any one register into a super packet; and encoding circuitry for impressing said super packet into an optical super packet and impressing thereupon an optical label determining which of said first ports said optical super packet is directed.

8. The system of claim 7, wherein a maximum size of said super packet on said core network is greater than a maximum size of the packets on said client networks.

9. The system of claim 7, wherein a plurality of wavelength-separated optical channels link said core network to said edge router.

10. The system of claim 7, wherein a larger number of download channels link said core network to a disassembler than upload channels linking said core network to said assembler.

11. The system of claim 7, wherein at least one of said client networks operates according to packet over SONET.

12. The system of claim 7, wherein said core network includes a plurality of optical routers including wavelength conversion of payloads of said optical super packet for routing said super optical packet according said optical label associated therewith.

13. A method of routing packets between a core network utilizing optical label switching and client networks utilizing at least some electronic routing, comprising the steps performed at an edge router between said core network and one of said client networks of:

receiving from said one client network a plurality of packets including packet payloads and a destination on another of said client networks;

sorting said packets according to egress ports of said core network associated with said destination thereof;

buffering said sorted packets into respective queues;

assembling said buffered packets in one of said queues into a payload of a super packet whenever either a length of packets to be buffered in said one queue exceeds a predetermined maximum or a timeout of said packets buffered in said queue exceeds a predetermined age; and encoding an optical label onto said super packet indicating said egress port of assembled packets.

14. The method of claim 13, further comprising optically routing said super packet across said core network from said ingress port to said egress port through optical routers which wavelength convert said payloads of said super packet according to said optical label.

15. The method of claim 14, further comprising the steps performed at an edge router located at said egress port of:

receiving said super packet;

disassembling said super packet into constituent packets including destination thereof; and inputting respective ones of said constituent packets including destination thereof onto a client network associated with said egress port.

16. The method of claim 13, wherein said sorting is performed additionally according to attribute of service for said packets as well as according to said egress port.

17. The method of claim 13, further comprising extracting said received packets from a repetitive time-multiplexed stream.

18. A communication network, comprising:

a core network comprising a plurality of optical routers linked by optical links and switching first packets having first payloads and associated first headers, said headers having a first number of bits;

a plurality of client networks at least some of which comprise a plurality of electronic routers and switch second packets having second payload and associated second headers, said second headers having a second number of bits greater than said first number of bits; and edge routers linking one of said electronic routers in a respective one of said client networks to respective ones of said optical routers and capable of forming a plurality of said first packets destined for one of said client networks other than said respective one client network into a second packet and generating said associated first header, wherein each of said edge routers comprises:

a plurality of electronic buffers for queuing said second packets received from said respective one client network according to which of other of said client networks said second packets are destined, a plurality of maximum packet size registers associated with each of said buffers, a plurality of timeout limit registers associated with each of said buffers, and one or more said second packets stored in a respective buffer are aggregated into one of said first packets when either of an associated maximum size registers or an associated timeout limit register is triggered.

19. The communication network of claim 18, wherein said optical routers operate with optical label switching according to said first headers and wherein said edge routers sub-carrier multiplex said first headers onto an optical carrier impressed with said first payloads.

* * * * *